(12) United States Patent
Stafford et al.

(10) Patent No.: US 8,504,611 B2
(45) Date of Patent: Aug. 6, 2013

(54) SYSTEM AND METHOD FOR DIGITAL PICTURE FRAME SYNDICATION

(75) Inventors: Jeffrey S. Stafford, Overland Park, KS (US); Jeffrey Michael Sweeney, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 968 days.

(21) Appl. No.: 12/130,628

(22) Filed: May 30, 2008

(65) Prior Publication Data

US 2009/0295991 A1   Dec. 3, 2009

(51) Int. Cl.
*G06F 15/16* (2006.01)
(52) U.S. Cl.
USPC .............. 709/203; 455/414.1; 455/415
(58) Field of Classification Search
USPC ......... 709/203; 379/100, 142.04; 455/414.1, 455/415, 566; 345/173; 348/500, 739
See application file for complete search history.

(56) References Cited

U.S. PATENT DOCUMENTS

| | | | |
|---|---|---|---|
| 7,117,256 B1 * | 10/2006 | Blinn | 709/219 |
| 2003/0233469 A1 * | 12/2003 | Knowlson et al. | 709/238 |
| 2004/0032400 A1 * | 2/2004 | Freeman et al. | 345/173 |
| 2004/0044725 A1 * | 3/2004 | Bell et al. | 709/203 |
| 2004/0044785 A1 * | 3/2004 | Bell et al. | 709/238 |
| 2007/0081643 A1 * | 4/2007 | Divine | 379/100.01 |
| 2007/0226734 A1 * | 9/2007 | Lin et al. | 717/177 |
| 2009/0041048 A1 * | 2/2009 | Borrel | 370/419 |
| 2009/0161590 A1 * | 6/2009 | Lewis et al. | 370/312 |
| 2009/0292822 A1 * | 11/2009 | Blair | 709/238 |

* cited by examiner

*Primary Examiner* — Tauqir Hussain
(74) *Attorney, Agent, or Firm* — Swanson & Bratschun, L.L.C.

(57) ABSTRACT

A system and method for synchronizing feeds for multiple digital picture frames. Pictures are received. Each of the pictures is associated with one or more feeds. One or more of a number of digital picture frames are designated to receive each of the one or more feeds. User preferences are received for delivering the one or more feeds. The one or more feeds are communicated to the one or more digital picture frames designated to receive the one or more feeds.

20 Claims, 7 Drawing Sheets

You could label more elements of the digital picture frame

SYSTEM AND METHOD FOR DIGITAL PICTURE FRAME SYNDICATION

BACKGROUND

With advances in digital imaging techniques, devices, and processes, digital photography has become widespread. Digital images may be displayed, printed, stored, manipulated, transmitted, and archived much easier than traditional photographs. As a result, digital picturegraphy has nearly replaced traditional photography devices and processing. Digital picture frames are a way to display digital pictures without the need to print them.

Digital picture frames allow users to display a number of photographs at an adjustable time interval. This ability to display a set of images without printing has increased the popularity of digital picture frames. In most cases, a user updates the pictures displayed on the picture frame using a memory card or a universal serial bus (USB) interface. In some cases, finding the proper equipment and organizing pictures to display on the digital picture frame may be a tedious process.

SUMMARY

One embodiment includes a system and method for synchronizing feeds for multiple digital picture frames. Pictures may be received. Each of the pictures may be associated with one or more feeds. One or more of a number of digital picture frames may be designated to receive each of the one or more feeds. User preferences may be received for delivering the one or more feeds. The one or more feeds may be communicated to the one or more digital picture frames designated to receive the one or more feeds.

Another embodiment includes a server that may be configured to communicate a feed to multiple digital picture frames. The server may include a user interface configured to receive pictures selected by a user. The user interface may prompt the user to select one or more feeds associated with each of the pictures and associate each of the one or more feeds with one or more digital picture frames. The server may also include a memory configured to store the pictures for communication in one or more feeds to one or more digital picture frames. The server may also include a transceiver configured to communicate the pictures to one or more digital picture frames previously associated with the one or more feeds.

Yet another embodiment includes a digital picture frame for receiving feeds. The digital picture frame may include a processor configured to format pictures for a display. The picture frame may also include a memory in communication with the processor configured to store the pictures for display. The picture frame may also include a user interface in communication with the memory configured to receive user input for updating display preferences. The picture frame may also include a transceiver in communication with the memory configured to receive the pictures associated with a feed. The display may show the pictures in accordance with the display preferences.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide a system and method for uploading and transmitting digital pictures in feeds to digital picture frames and other wireless devices. A feed is a queue, grouping or sequence of pictures. The illustrative embodiments may be used to upload digital pictures to a website, personal computer, program or other platform to create and manage feeds. A user may determine which digital picture frames will receive specific feeds. The feeds may be communicated to multiple digital picture frames that may be configured to display feeds and pictures according to user preferences.

A server managing the pictures and feeds may communicate with recipient devices through a wireless network. The digital picture frame or other recipient device may include a wireless receiver or transceiver, memory to store local and feed pictures, and a user interface for configuring how feeds and pictures are displayed. In one embodiment, the feeds may be sent directly to the associated digital picture frame utilizing a hardware address. In another embodiment, a personal computer may be utilized to upload pictures, manage feeds, subscribe to feeds of one or more other users, associate one or more digital picture frames with the feeds, and review incoming feeds before transmitting the feeds to the user's one or more digital picture frames.

Figure 1:
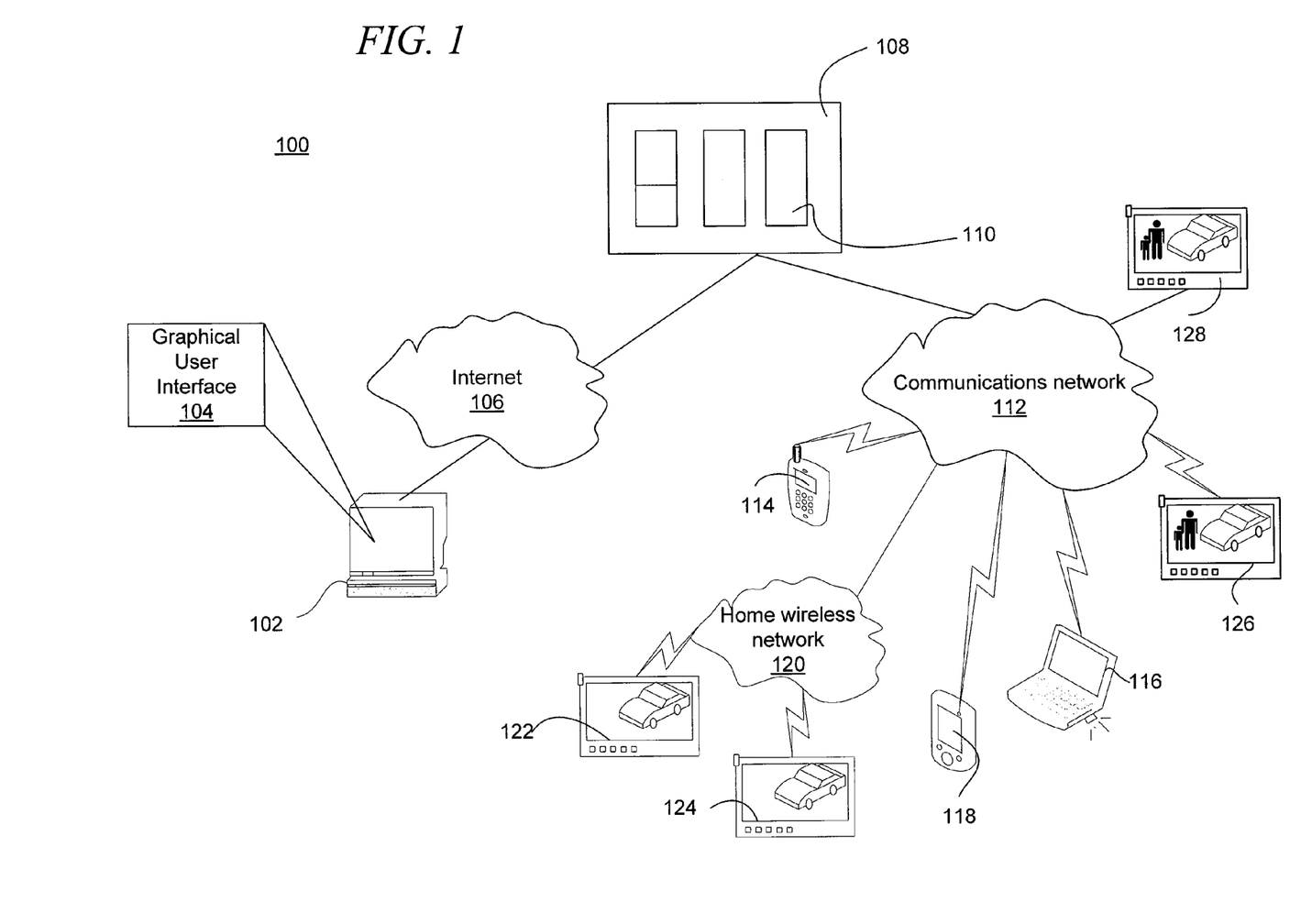
FIG. 1 is a pictorial representation of a communications environment in accordance with an illustrative embodiment.

FIG. 1 is a pictorial representation of a communications environment in accordance with an illustrative embodiment. In one embodiment, the communication environment 100 of FIG. 1 includes a home computer 102 featuring a user interface 104, in communication with a communications management system 108 over Internet 106. The communication environment 100 may also include a server 110, a communications network 112, a home wireless network 120, a cell phone 114, a laptop 116, a personal digital assistant 118, and digital picture frames 122, 124, 126, and 128.

The home computer 102 is a personal computing device configured to manage data and information. The home computer 102 may be a desktop computer, laptop, personal digital assistant (PDA), set-top box, wireless device or other computing element suitable for managing the display of digital pictures by the digital picture frames 122, 124, 126, and 128. The home computer 102 may include a user interface 104. One embodiment of the user interface is further illustrated in FIG. 6. The home computer 102 may also utilize a connection to the Internet 106, to access a website for digital picture management. The connection may be a wired connection, such as Ethernet, fiber optics, DSL or cable or may be a wireless connection, such as WiMAX, WiFi, GSMR or satellite.

As previously described, the home computer 102 may include an application for uploading pictures, managing feeds, subscribing to feeds of one or more other users, associating one or more digital picture frames with the feeds, reviewing incoming feeds before transmitting the feeds to the user's one or more digital picture frames, setting user preferences for transmitting and receiving feeds.

The Internet connection 106 may link the home computer to a communications management system 108 for enabling, initiating, routing, and managing communications between one or more devices. The communications management system 108 may include a server 109. The server is a computing device and software that allows a user to manage one or more feeds of digital picture frames and serves the feeds to one or more digital picture frames or other remote clients according to user preferences.

The server 109 may store the digital pictures and enable a website or other interface to upload, store, and manage digital pictures and feeds associated with the digital pictures.

A communications network 112 may link the communications management system 108 to a number of wireless devices 114, 116, 118, 126, 128 or a home wireless network 120. The communications network may send and receive the electronic signals through any number of transmission mediums.

Examples of devices that may receive digital picture feeds may include a cell phone 114, a laptop computer 116, a personal digital assistant 118, and digital picture frames 122, 124, 126, and 128. In one embodiment, the devices may receive the signals Tirelessly through a small area or large area network. In one example, the signals may be sent through a wireless network, such as GSM, PCS, GSMR, CDMA, WiMAX or other similar networks. For example, the home wireless network 120 may be a WiFi, Bluetooth® or other short range wireless network.

Figure 7:
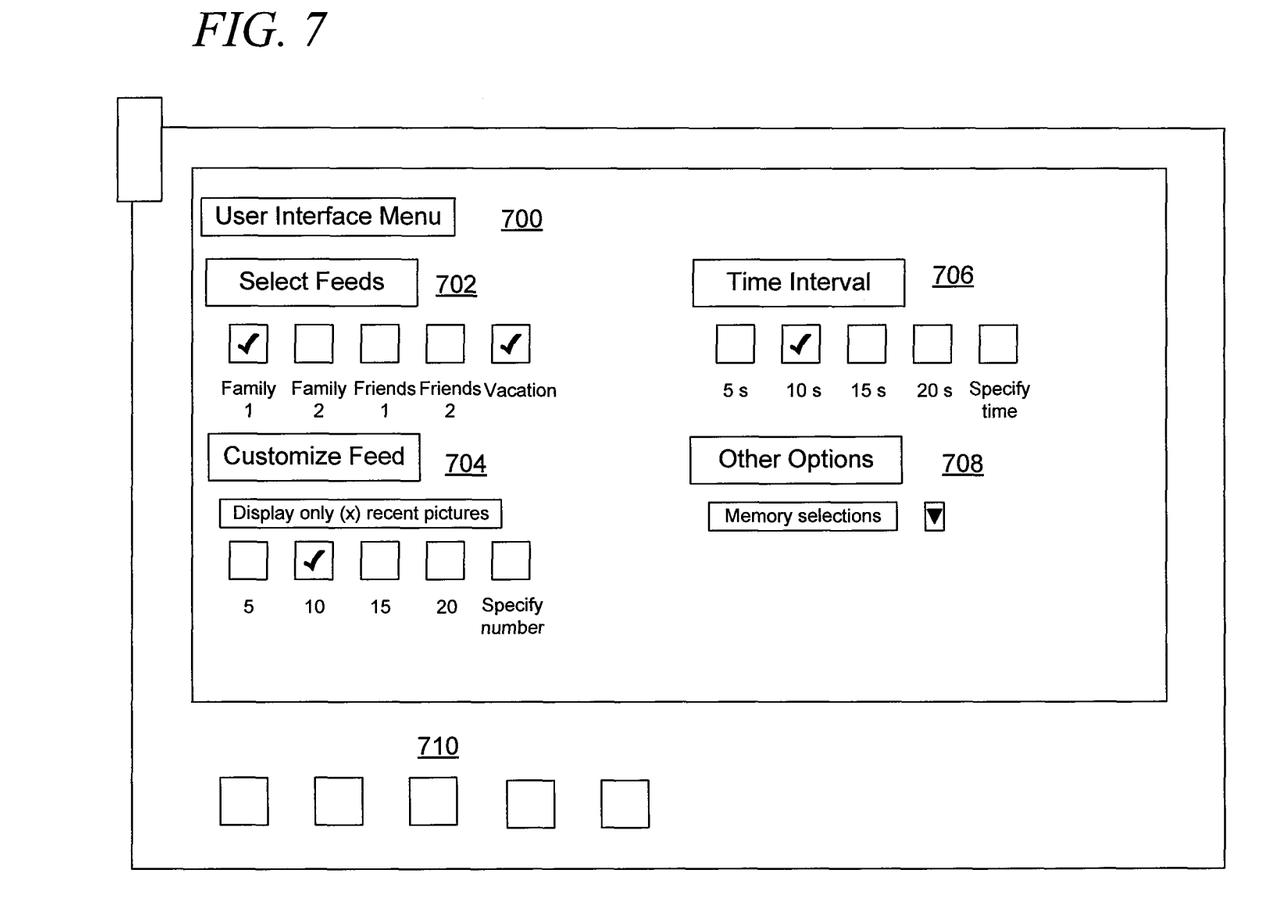
FIG. 7 is a pictorial representation of a user interface for configuring a display of picture feeds in accordance with an illustrative embodiment.

The home wireless network 120 may also be configured to communicate feeds for a plurality of digital picture frames 122 and 124. The home wireless network 120 and a user interface for digital picture frames, as shown in FIG. 7, may allow a user to display different feeds in different locations in the home.

In one embodiment, the feeds and other content may be transmitted or streamed to the home computer 102 for subsequent transmission by the home computer 102 to one or more of the digital picture frames 122, 124, 126, and 128. In one embodiment, the home computer 102 may manage, control or distribute the home wireless network 120. In particular, the home computer 102 may control the feeds and pictures distributed by the digital picture frames 122, 124, 126, and 128. The home computer 102 may also be used to set the user preferences for selecting feeds and pictures and displaying the feeds and pictures on the digital picture frames 122, 124, 126, and 128.

In one embodiment, the communications management system 108 and the server 110 may receive feeds from any number of users through other personal computers, wireless devices or other communications devices utilizing a web browser, application or interface. The feeds may be aggregated and managed by the communications management system 108 for transmission to one or more other devices directly or through a personal computer. In one embodiment, a number of users may contribute picture content included in a feed distributed to the digital picture frames 122, 124, 126, and 128 associated with the feed. The home computer 102 may manage which feeds or pictures are added for distribution to one or more of the digital picture frames 122, 124, 126, and 128. For example, the feeds may include pictures that the user does not want displayed on one or more of the digital picture frames 122, 124, 126, and 128.

As a result, the user may receive individual pictures or entire feeds from the feeds distributed to the selected digital picture frame. The home computer 102 may include an antenna, Ethernet connection, network adapter, wireless transceiver or other hardware/software for communicating with the digital picture frames 122, 124, 126, and 128 directly or through intermediary devices. In one embodiment, a software application may allow a user to share online pictures and feeds while simultaneously controlling the feeds displayed on one or more of the digital picture frames 122, 124, 126, and 128.

Figure 2:
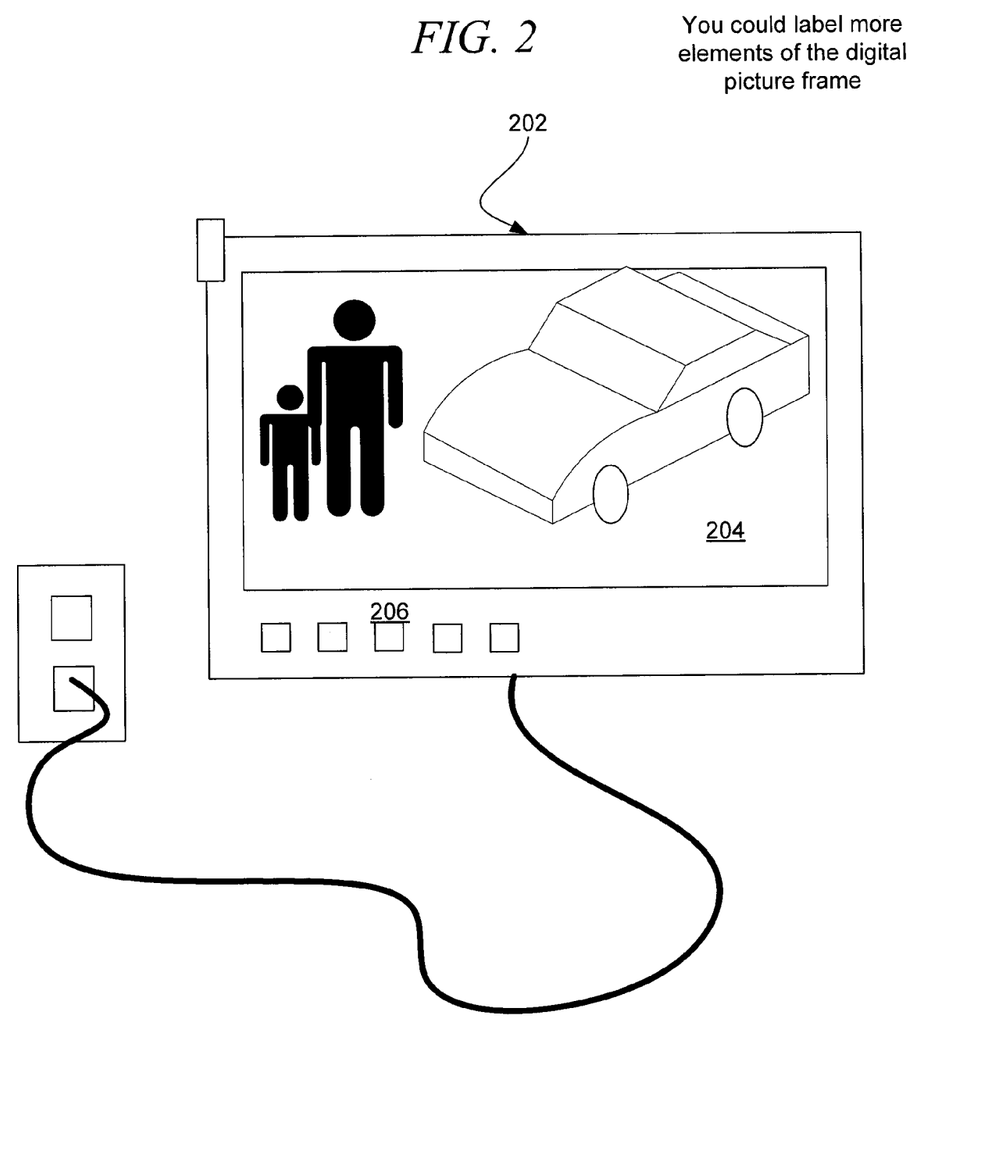
FIG. 2 is a pictorial representation of a digital picture frame in accordance with an illustrative embodiment.

FIG. 2 is a pictorial representation of a digital picture frame in accordance with an illustrative embodiment. The digital picture frame 202 of FIG. 2 may include an electronic display 204 and buttons 206. The digital picture frame 202 may be powered through a standard electrical outlet, batteries, solar power or other power source.

The electronic display 204 is a graphical interface for communicating images and data. The electronic display 204 may be configured to display pictures stored locally by the digital picture frame 202 and pictures received from one or more feeds. The electronic display 204 may include a wireless transceiver or network port configured to receive the feeds through one or more networks.

The buttons 206 are interface elements configured to receive user input. In the current embodiment, the display 204 may be configured according to display preferences through the use of buttons 206. The buttons 206 may allow a user to control selection elements that will allow a user to enter the display preferences. The display preferences is the information that controls the display of pictures, feeds, and other content by the digital picture frame 202. For example, the display preferences may specify an amount of time each picture is displayed, the types of transitions that are used, power saving preferences, order that pictures and feeds are displayed, maximum and minimal size and pixel allowances, and other similar information that controls how pictures or videos are displayed by the digital picture frame 202. In other embodiments, the buttons 206 may be portions of a touch screen, hard keys, soft keys, scroll wheels, track ball, a mouse, a stylus, commands or other interactive elements suitable for managing the digital picture frame.

Figure 3:
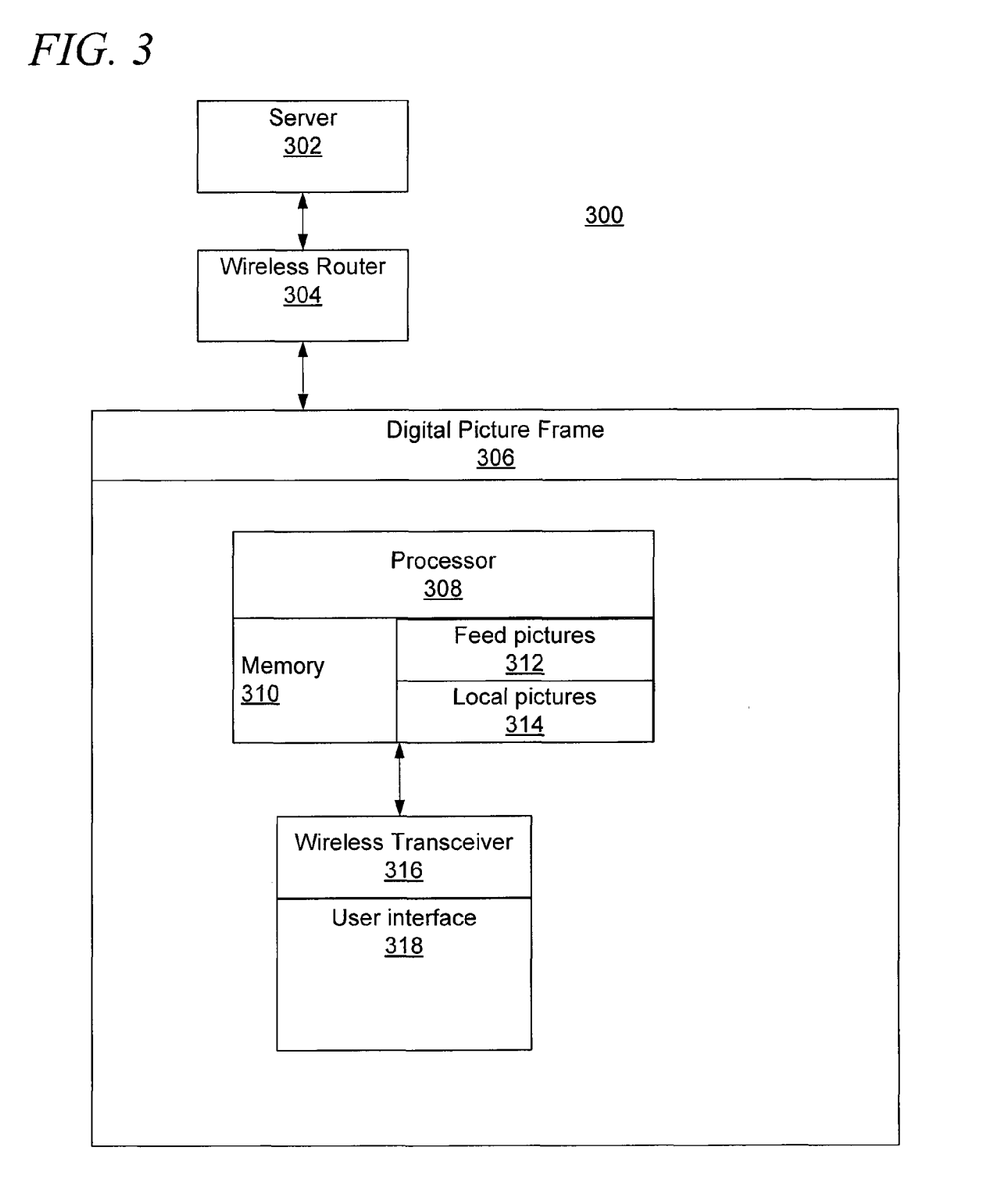
FIG. 3 is a block diagram of a server linked to a digital picture frame in accordance with an illustrative embodiment.

FIG. 3 is a block diagram of server linked to a digital picture frame in accordance with an illustrative embodiment. The system of FIG. 3 may be utilized to send and receive pictures in one or more feeds. The system 300 may include a server 302, a wireless router 304, and a digital picture frame 306. The digital picture frame 306 may include a wireless transceiver 316, a user interface 318 which may include a feed interface 320, a processor 308, and a memory 310 which may store a feed pictures 312 and local pictures 314. The server is a particular implementation of the server 110 of FIG. 1.

The server 302 and the digital picture frame 306 may be configured to receive user preferences. The user preferences is the information that controls the uploading, management, and synchronization of the feeds between the server 302 and the digital picture frame 306. The user interface 318 is one or more interactive elements for receiving user input, display preferences, and other selections. The user interface 318 may include the display, touch screen buttons, and other similar components of the digital picture frame 306.

The server 302 may include a user interface for configuring the feeds and the communication of the feeds to the specified recipient devices. The server 302 may receive the user preferences and identifiers for digital picture frames from a website, interactive voice response system or computer program that interfaces with the server 302. For example, using a PDA equipped with a web browser, the user may utilize the user interface to specify the IP address of a digital picture frame that is to be associated with a friends feed and a vacation feed that is updated any time pictures are added by one or more users.

The system 300 may utilize a wireless router 304 to transmit pictures to the selected digital picture frame 306. The wireless router 304 is an Internet working device utilized to connect one or more different networks. In one embodiment, the wireless router 304 may be utilized to generate a wireless network for a home or business. The wireless router 304 may be a personal or commercial device. In one embodiment, the wireless router 304 may communicate with one or more devices including the digital picture frame 306 utilizing a home wireless network that communicates with the server 302 through a network connection, such as DSL or a cable Internet connection. The wireless router 304 may communicate with the digital picture frame 306 using any number of addressing standards or protocols. In one embodiment, the digital picture frame 306 may receive communications based on an identifier, such as an Internet Protocol IP) address, MAC address, network address or hardware address.

The digital picture frame 306 is an electronic display, such as, for example, the digital picture frame 202 of FIG. 2. The digital picture frame 306 may include the wireless transceiver 316 for receiving feeds. The wireless transceiver 316 is a communications element configured to send and receive signals from the wireless router 304. For example, the wireless transceiver 316 and the wireless router 304 may be configured to communicate WiFi or Bluetooth® signals. In another embodiment, the digital picture frame 306 may only include a receiver for receiving feeds. The wireless transceiver 316 may also include a port for connection with a wired communications connection. For example, the wireless transceiver 316 may be an Ethernet card for communicating through a Ethernet connection of a business local area network.

Once feeds are received by the digital picture frame 306, the feeds may be configured for display by the user interface 318. The user interface 318 may communicate with the processor 308 to convert the received feed signals back to digital pictures and formats that may be displayed by the digital picture frame 306. The user interface 318 may include display preferences including the options and selections for storing, displaying, and accessing the feeds and corresponding digital pictures. The user interface 318 may include selection elements as shown in FIG. 7.

After configuration, feeds may be stored in the memory 310. The memory 310 is a hardware element, device or recording media configured to store data for subsequent retrieval or access at a later time. The memory 310 may be static or dynamic memory. The memory 310 may include a hard disk, random access memory, cache, removable media drive, mass storage or configuration suitable as storage for data, instructions, and information. In one embodiment, the memory 310 and processor 308 may be integrated. The memory may use any type of volatile or non-volatile storage techniques and mediums. The memory 310 may be configured to store feed photos 312 and local pictures 314. The memory 310 may be configured by selection elements as shown in FIG. 7. In one embodiment, the modules and elements of the digital picture frame 306 may be stored in the memory 310 for execution by the processor 308.

The digital picture frame 306 may include a processor 308. The processor 308 may process programs, instructions, and commands retrieved from the memory 310. Additionally, the processor 308 may format and control display of the pictures included in the feeds received through the wireless transceiver. The processor 308 is circuitry or logic enabled to control execution of a set of instructions. The processor 308 may be a microprocessor, digital signal processor, central processing unit or other device suitable for controlling an electronic device including one or more hardware and software elements, executing software, instructions, programs, and applications, converting and processing signals and information, and performing other related tasks. The processor 308 may be a single chip or integrated with other computing or communications elements.

Figure 4:
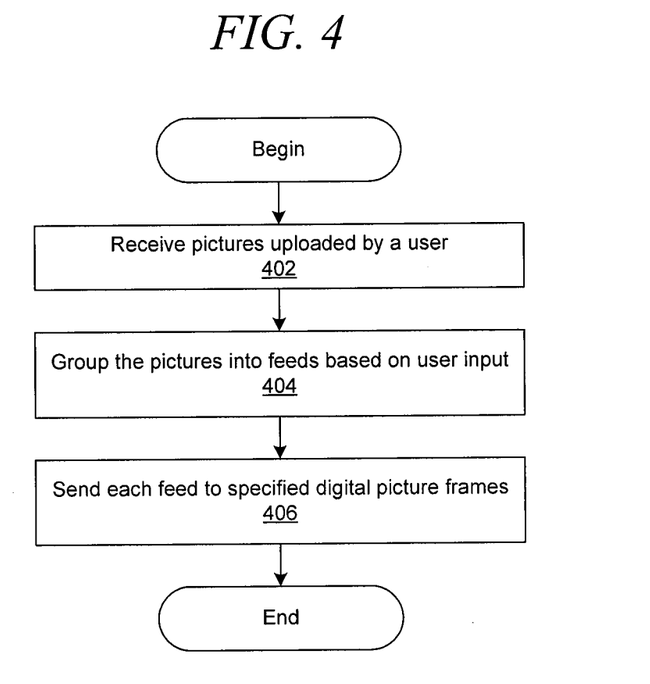
FIG. 4 is a flowchart of a process for assigning pictures to feeds in accordance with an illustrative embodiment.

FIG. 4 is a flowchart of a process for assigning pictures to feeds in accordance with an illustrative embodiment. The process may be implemented by a server through a user interface. In one embodiment, the user interface is a program executed on a personal computer. In another embodiment, the user interface may be a website or interactive voice response system utilized to manage various functions performed by the server.

The process may begin with the server receiving pictures uploaded by a user (step 402). The server may store the pictures in a memory of the server for later communication to multiple digital picture frames. In one embodiment, the pictures may be automatically uploaded from a program or file based on a configuration of user preferences. For example, the user may label different files on a personal computer to be automatically uploaded to the server, the files or pictures may also specify any number of feeds.

Next, the server groups the pictures into feeds based on the user input (step 404). Pictures may be grouped into feeds and labeled through the use of a user interface, such as the interface shown in FIG. 6. The pictures may be grouped into the feeds individually or as a group. Drop down menus, lists, icons, designators or other indicators may indicate the one or more feeds a picture is assigned to. The server may allow a user to create new feeds and assign feeds to picture frames.

Next, the server sends each feed to digital picture frames (step 406). Feeds may then be transmitted to specified digital picture frames according to user preferences. Pictures may be assigned to one or more digital picture frames and one or more feeds may be assigned to each digital picture frame. The illustrative embodiments may allow pictures to be syndicated for transmission and displayed by multiple digital picture frames. As a result, a user may receive pictures for display that are updated any time pictures are uploaded to a feed. The process of FIG. 4 may allow multiple users to upload pictures to a shared feed for transmission to multiple digital picture frames.

Figure 5:
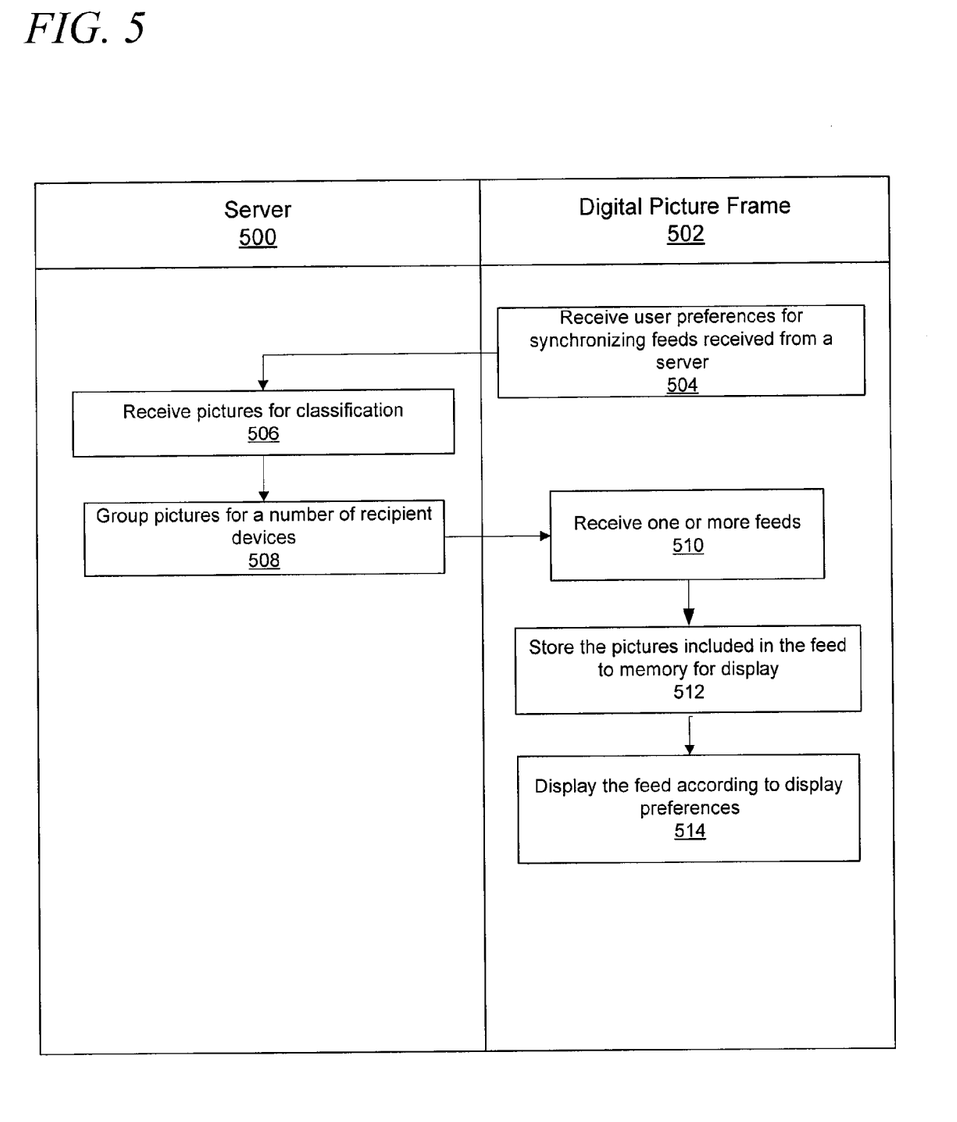
FIG. 5 is a flowchart of a process for synchronizing picture feeds in accordance with an illustrative embodiment.

FIG. 5 is a flowchart of a process for synchronizing picture feeds in accordance with an illustrative embodiment. The process of FIG. 5 may be implemented between a server 500 and at least one digital picture frame 502. The synchronizing process may be configured to occur according to user preferences.

In one embodiment, the process for synchronizing picture feeds may begin with a digital picture frame 502 receiving user preferences for synchronizing feeds received from a server (step 504). User preferences may be specified for the server 500 and similarly displayed preferences may be specified for the digital picture frame 502. In one embodiment, the user preferences and display preferences may be received through either device.

The user preferences for the server 500 may be received through a user interface or a program, communications link or website. The user preferences may specify the interval or frequency at which the digital picture frame 502 is sent updated feeds. For example, the feeds may be synchronized immediately when updated daily, weekly or at other intervals that may be selected or manually indicated by the user. The user may also specify an event that triggers a feed update. For example, the feeds may be transmitted based on a user selection of a synchronization icon.

The display preferences for the digital picture frame may indicate which feeds are displayed, how long pictures are displayed, transitions utilized, color schemes, automatic image rotation, and other similar preferences for managing how and when the pictures are displayed.

The server 500 may receive pictures for classification (step 506). The pictures may be classified or grouped for one or more feeds. In one embodiment, the user may utilize check marks, a text identifier, and a menu to classify each picture into one or more feeds.

Next, the server 500 groups the pictures for a number of recipient devices (step 508). After pictures are uploaded and classified, the pictures may be grouped into feeds 508 for transmission to the digital picture frames 502.

Next, the digital picture frame 502 receives one or more feeds (step 510). The feeds may be transmitted to the digital picture frame 502 from the server 500 using a stream, file or message. Any number of standards or protocols may be used to send and receive the digital pictures.

The digital picture frame 502 stores the pictures included in the feed to memory for display (step 512). The digital picture frame 502 may include one or more memories including removable storage media for storing the feeds and associated pictures.

Next, the digital picture frame 502 displays the feed according to display preferences (step 514).

Figure 6:
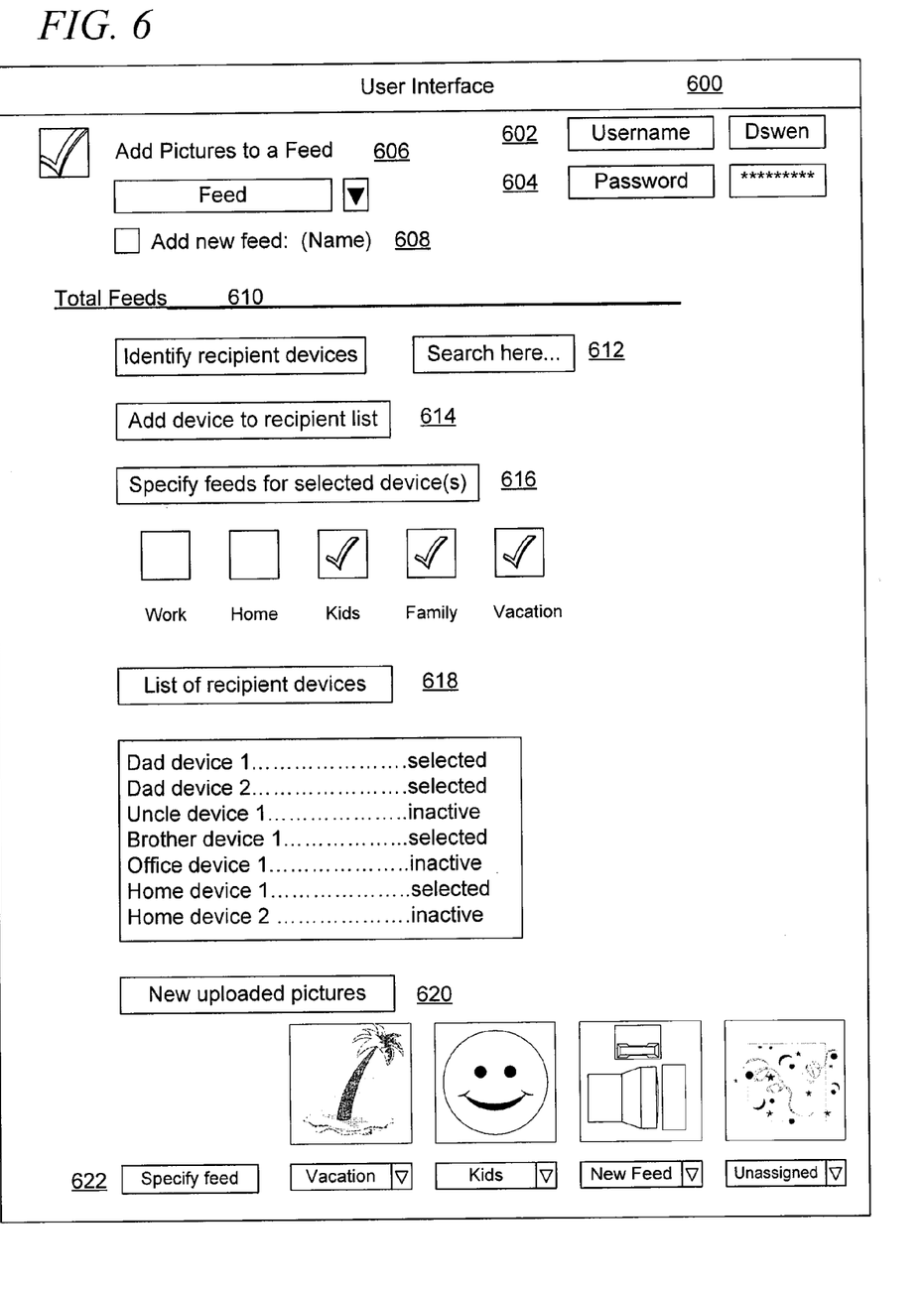
FIG. 6 is a pictorial representation of a user interface for managing picture feeds in accordance with an illustrative embodiment.

FIG. 6 is a pictorial representation of a user interface for managing picture feeds in accordance with an illustrative embodiment. The user interface 600 of FIG. 6 may include a username 602, a password 604, a selection elements 606 and 608, total feeds 610, a search element 612, selection elements 614 and 616, a list 618, newly uploaded pictures 620, and selection element 622.

Username 602 may require users to enter a username to gain access to previously uploaded feeds and to upload new photos under a user's account. Similarly, the password 604 may require users to enter a password to gain access to previously uploaded feeds and to upload new photos under a user's account.

Selection element 606 may allow a user to begin the process of adding photos to a single or multiple feeds. Users may then be able to select a feed and upload all photos to the specified feed or use another selection element activated by the preferences to specify a feed of one photo at a time as shown by the newly uploaded photos 622.

Selection element 608 may allow users to add and name a new feed or to rename previously established feeds. Total feeds 610 may show a user the current number or list of created feeds or feeds subscribed to by one or more digital picture frames.

Search element 612 may allow users to search all identified and registered digital picture frames or other wireless devices associated with one or more feeds. Users may add devices to a list by registration or association. The digital picture frame may be registered to receive feeds utilizing a phone number, email address, IP address, MAC address, network address or hardware address.

Selection element 614 may allow users to add identified devices to a recipient list after a locating search is performed by search element 612. Selection element 616 may allow users to specify which feeds may be sent to the currently selected devices.

List 618 may display all recipient devices and their current receiving status. A user may also be able to add devices to receive the current feed selection from the menu by changing their current receiving status. From the menu a user may quickly specify which devices are to receive the currently selected feed or plurality of feeds.

Newly uploaded pictures 620 may display newly uploaded pictures for selection. The newly uploaded pictures 620 may display pictures in thumbnail view or allow users to view full-size photos. Selection element 622 may allow users to specify a feed for each individual picture.

FIG. 7 is a pictorial representation of a user interface for configuring display of picture feeds in accordance with an illustrative embodiment. The user interface 700 is a particular implementation of the display 204 of the digital picture frame 202 of FIG. 2. The user interface 700 of FIG. 7 may include selection elements 702, 704, 706, 708, and buttons 710. The selection elements are interfaces for receiving user input and selections. In one embodiment, the selection elements 702, 704, 706, 708 may be portions of a touch screen utilized to manage a digital picture frame. The selection elements may also be buttons, hard keys, soft keys, scroll wheels, track ball, commands or other interactive elements. The selection elements 702, 704, 706, and 708 may be associated with any number of prompts, selections, choices or other information.

Selection element 702 of the user interface 700 may allow a user to determine which feeds may be displayed on a digital picture frame. The ability to manage multiple feeds may be particularly useful when a plurality of digital picture frames are linked to a home wireless network as shown in FIG. 1. In one embodiment, the user may press or activate the selection element 702 to select any number of feeds displayed on a menu visually or textually. For example, different digital picture frames may be configured to each displayed separate feeds based on their location within the home.

Selection element 704 may allow a user to determine the number of photos displayed from each feed. For example, if a picture frame has a plurality of feeds from different children with differing amounts of pictures a user may allow only ten of the most recent pictures from each feed so each feed is represented equally. A user may also choose one feed to have more displayed photos than another.

Selection element 706 may allow a user to determine the amount of time each photo from the respective feed is displayed. For example, the user may use the selection element 706 to indicate that one feed is to be displayed for more time than another based on the importance to the user.

The selection element 706 may also allow a user to determine how pictures from multiple feeds are displayed. In one embodiment, pictures from a first family feed and a vacation feed may be set to be displayed randomly. In another embodiment, the pictures from each feed may be displayed for two minutes before changing to the other feed.

Selection element 708 may allow a user to control memory options for each feed and local pictures. For example, the selection element 70 may control memory options that allow a user to permanently store a photo from a feed for later display. Selection element 708 also may allow a user to manually delete individual photos. For example, deleting individual photos may be useful if a picture is accidentally included in a feed or includes inappropriate content that may embarrass a user when displayed.

The interface elements may also include buttons 710. The buttons 710 may also be used to manually operate the digital picture frame, manage feeds, accept feed invitations, and otherwise control the digital picture frame. The buttons 710 may include a directional input button. In another embodiment the interface could be a touch screen.

The illustrative embodiments may be implemented in hardware, software, or firmware. In one embodiment, a digital picture frame syndication application may be operated from a personal computer of a user. The personal computer may acts as a server and interface to any number of other users. The personal computer may allow the users to register digital picture frames to receive one or more feeds. Pictures may be uploaded to the personal computer for distribution. Distribution may occur directly or through any number of wireless and wired networks. For example, the personal computer may stream the feeds directly to multiple digital picture frames registered with a program to receive communications from the picture syndication application.

The previous detailed description is of a small number of embodiments for implementing the invention and is not intended to be limiting in scope. The following claims set forth a number of the embodiments of the invention disclosed with greater particularity.

What is claimed:

1. A method for synchronizing feeds for a plurality of digital picture frames, comprising:
   receiving a plurality of pictures;
   associating each of the plurality of pictures with one or more feeds in response to user input;
   receiving user preferences for storage in a memory, the user preferences designating one or more of the plurality of digital picture frames to receive each of the one or more feeds, wherein the one or more feeds are enabled to receive pictures from a plurality of users remotely located from the plurality of digital picture frames according to user preferences, and wherein the user preferences indicate a synchronization schedule;
   receiving a selection of one or more of a plurality of contacts to be associated with each of the plurality of digital picture frames;
   inviting the one or more of the plurality of contacts to receive the one or more feeds; and
   communicating the one or more feeds from a server to each of the one or more of the plurality of digital picture frames designated to receive the one or more feeds in response to one of the plurality of contacts accepting an invitation.

2. The method according to claim 1, wherein the receiving a plurality of pictures, associating, designating, receiving user preferences, and communicating are performed by a platform.

3. The method according to claim 1, further comprising:
   linking the one or more digital picture frames with the server, and wherein a plurality of users are enabled to update the plurality of pictures in the one or more feeds according to access granted in the user preferences.

4. The method according to claim 3, wherein the linking further comprises:
   registering an identifier of the plurality of digital picture frames with the server for delivering the one or more feeds.

5. The method according to claim 4, wherein the identifier is any of an Internet Protocol address, a MAC address, a network address, and a hardware address.

6. The method according to claim 1, wherein each of the plurality of digital picture frames is designated to receive a plurality of the one or more feeds and coordinate display of pictures in the one or more feeds according to the user preferences.

7. The method according to claim 1, wherein the user preferences indicate whether each of the plurality of digital picture frames subscribes to the one or more feeds.

8. The method according to claim 1, wherein the user preferences specify the frequency the one or more feeds are communicated to the one or more digital picture frames.

9. The method according to claim 1, further comprising:
   managing the user preferences from the one or more digital picture frames.

10. A server configured to communicate a feed to a plurality of digital picture frames, the server comprising:
    a user interface configured to receive pictures selected by a user and a selection of one or more of a plurality of contacts to be associated with each of the plurality of digital picture frames, the user interface operable to prompt the user to select one or more feeds associated with each of the pictures, associate each of the one or more feeds with one or more of the plurality of digital picture frames according to user preferences stored in a memory, wherein the user preferences are enabled to specify a synchronization schedule, a picture quantity, a time interval for picture playback, and a playback sequence for each of the one or more feeds, the user interface further configured to send an invitation to the selected one or more of the plurality of contacts;
    the memory configured to store the pictures for communication in one or more feeds to a plurality of digital picture frames; and
    a transceiver configured to communicate the pictures directly to each of the plurality of digital picture frames previously associated with the one or more feeds, in response to one of the plurality of contacts accepting an invitation.

11. The server according to claim 10, wherein the transceiver communicates the one or more feeds to the one or more of the plurality of digital picture frames associated with the feed utilizing a network address or software address, and wherein the user preferences indicate a picture quantity, a time interval for each picture, and a playback sequence of each of the one or more feeds according to access granted in the user preferences.

12. The server according to claim 10, wherein the transceiver is configured to communicate the pictures associated with the one or more feeds when an update is made to the pictures stored in the memory.

13. The server according to claim 10, wherein the transceiver routes the one or more feeds to a personal computer for delivery to one of the plurality of digital picture frames associated with the feed.

14. The server according to claim 10, wherein the server is further configured to enable a plurality of pictures in the one or more feeds according to access granted in the user preferences.

15. The server according to claim 10, wherein the server is further configured to register an identifier of each of the plurality of digital picture frames with the server for delivering the one or more feeds.

16. The server according to claim 15, wherein the identifier is any of an Internet Protocol address, a MAC address, a network address, and a hardware address.

17. The server according to claim 10, wherein the user preferences indicate whether each of the plurality of digital picture frames subscribes to the one or more feeds.

18. The server according to claim 10, wherein the user preferences specify the frequency the one or more feeds are communicated to the one or more digital picture frames.

19. The server according to claim 10, wherein the server is configured to receive communication from one or more of the digital picture frames for managing the user preferences.

20. The method according to claim 1, further comprising: communicating pictures associated with the one or more feeds when an update is made to the pictures stored in the memory of the server.

* * * * *